June 19, 1923. 1,459,468

H. A. S. HOWARTH

MULTIPLE UNIT BEARING

Filed June 4, 1920 7 Sheets-Sheet 1

Witness
Chas. L. Grieshauer

Inventor
Harry A. S. Howarth
By Munn, Cameron, Lewis & Kerkam
Attorneys

June 19, 1923.
H. A. S. HOWARTH
MULTIPLE UNIT BEARING
Filed June 4, 1920
1,459,468
7 Sheets-Sheet 2
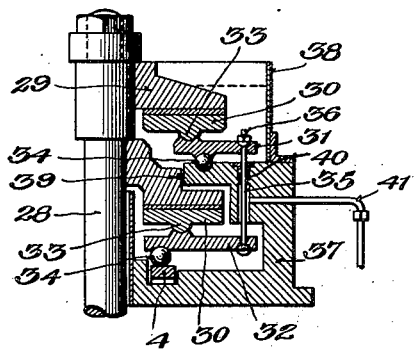
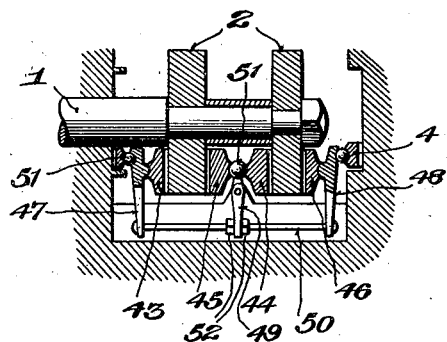
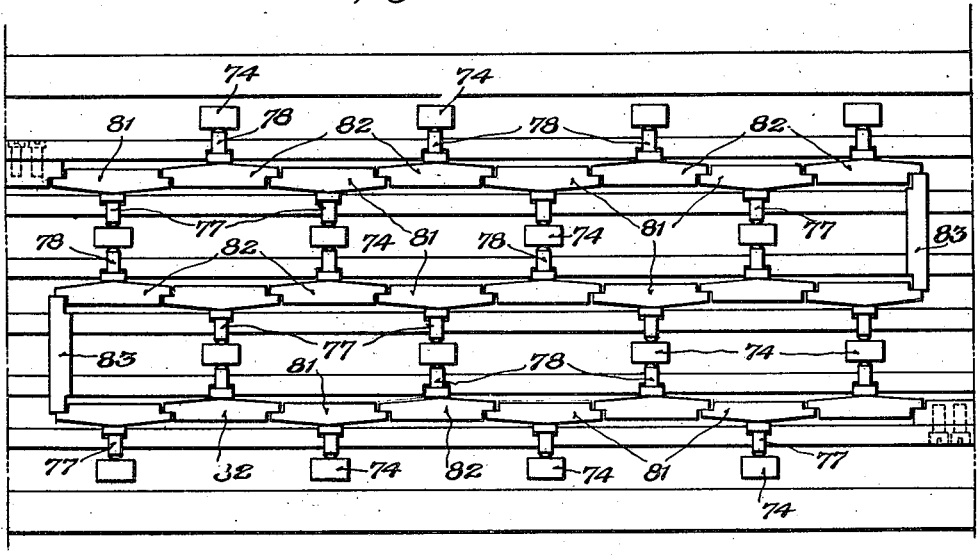

June 19, 1923.

H. A. S. HOWARTH

MULTIPLE UNIT BEARING

Filed June 4, 1920

Witness
Chas R. Giesbauer

Inventor
Harry A. S. Howarth
By Mauro, Cameron, Lewis & Kerkam
Attorneys

June 19, 1923.
H. A. S. HOWARTH
MULTIPLE UNIT BEARING
Filed June 4, 1920
1,459,468
7 Sheets-Sheet 4
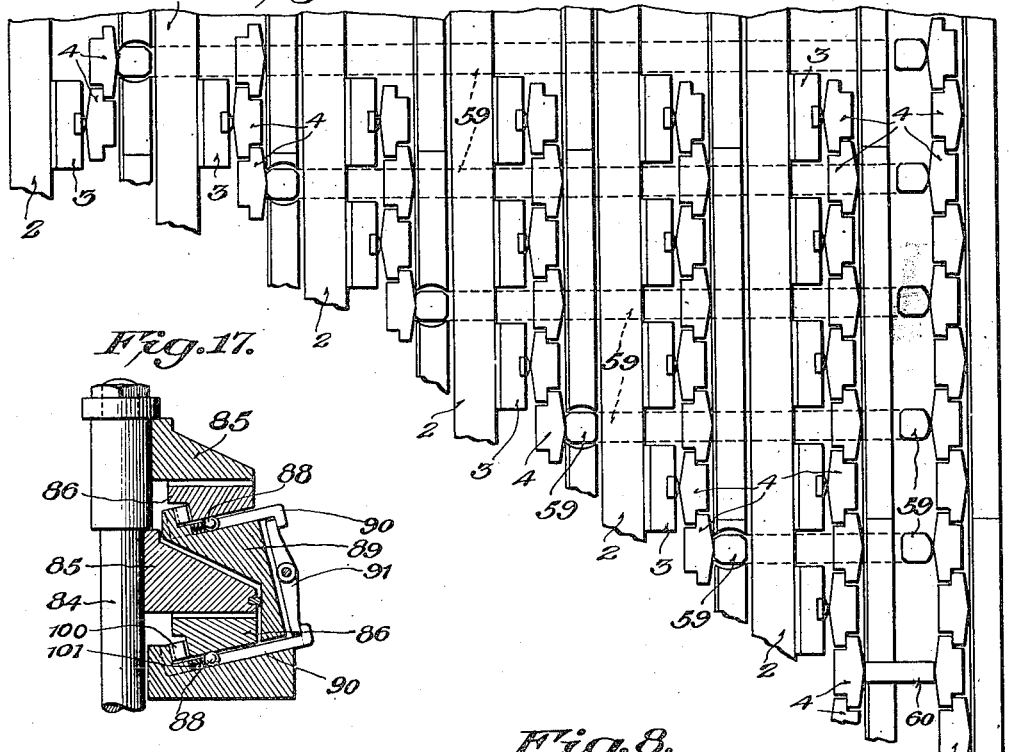
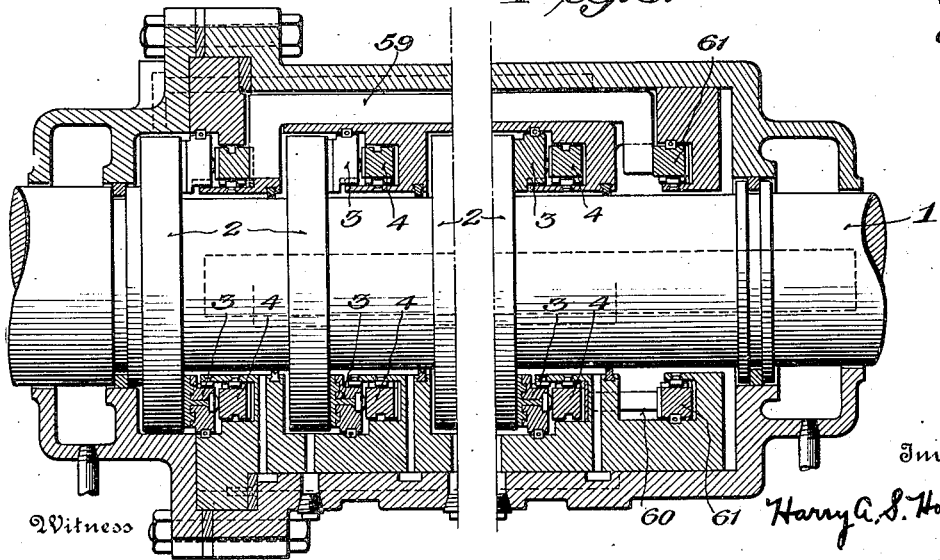

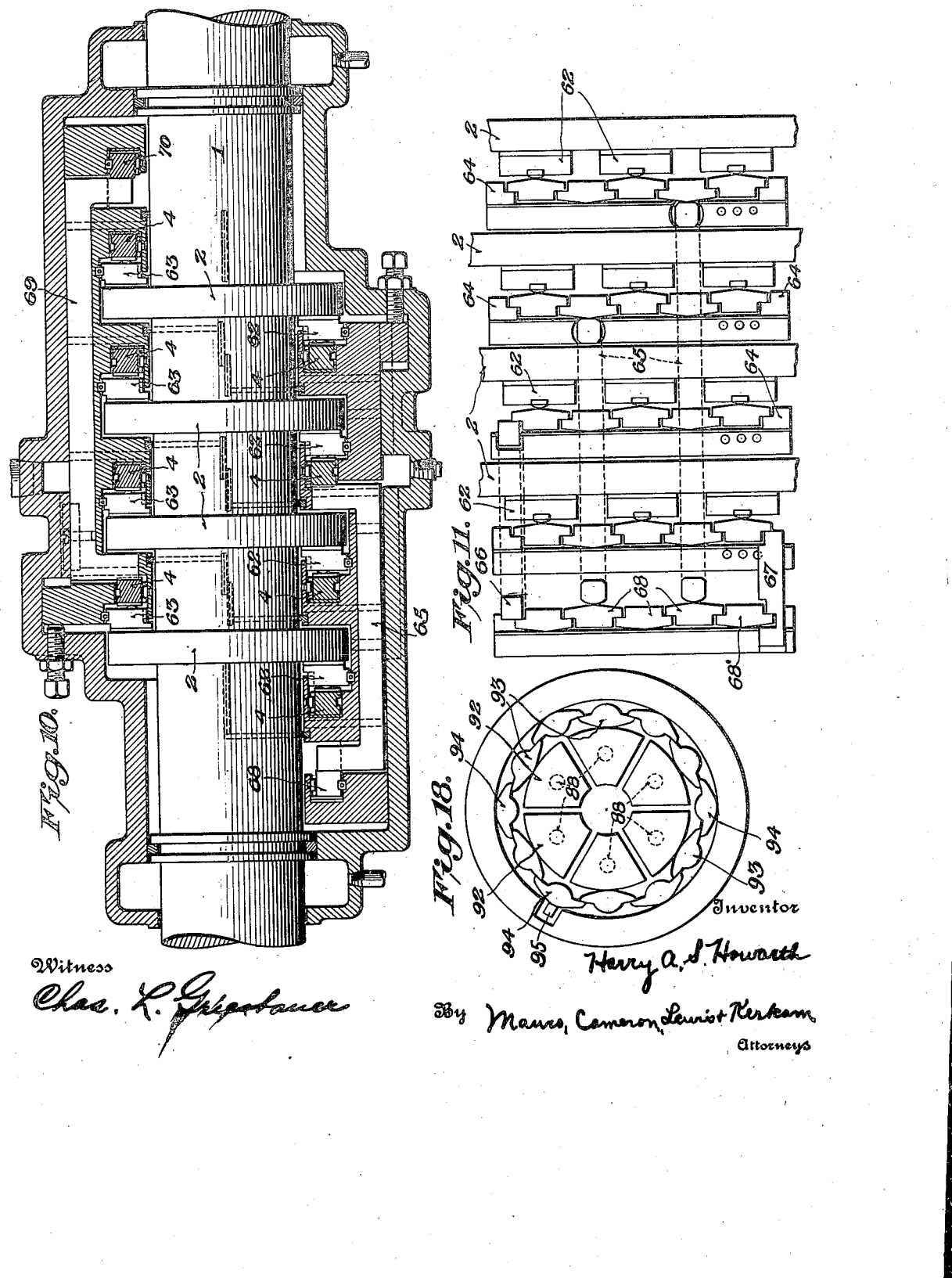

June 19, 1923.

H. A. S. HOWARTH 1,459,468

MULTIPLE UNIT BEARING

Filed June 4, 1920   7 Sheets-Sheet 6

Inventor
Harry A. S. Howarth

Witness
Chas. L. Griesbauer

By Mauro, Cameron, Lewis & Kerkam
Attorneys

June 19, 1923.

H. A. S. HOWARTH

MULTIPLE UNIT BEARING

Filed June 4, 1920

Witness
Chas. L. Griesbauer

Inventor
Harry A. S. Howarth
By Mauro, Cameron, Lewis & Kerkam
Attorneys

Patented June 19, 1923.

1,459,468

UNITED STATES PATENT OFFICE.

HARRY A. S. HOWARTH, OF PITTSBURGH, PENNSYLVANIA, ASSIGNOR TO ALBERT KINGSBURY, OF PITTSBURGH, PENNSYLVANIA.

MULTIPLE-UNIT BEARING.

Application filed June 4, 1920. Serial No. 386,534.

*To all whom it may concern:*

Be it known that I, HARRY A. S. HOWARTH, a citizen of the United States, and a resident of Pittsburgh, Pennsylvania, have invented new and useful Improvements in Multiple-Unit Bearings, which invention is fully set forth in the following specification.

This invention relates to bearings of various types and, more particularly, to multiple-unit bearings which comprise a plurality of pairs, groups or series of relatively rotatable and stationary bearing members. While capable of use in a wide variety of organizations of this character—such as journal or guide bearings of various forms—the present invention has special utility when applied to thrust bearings of the multiple-collar type, whether used in conjunction with horizontal, vertical or inclined shafts.

Heretofore it has been customary, with multiple-collar bearings, to equalize, as far as possible, the pressure on the respective collars by an individual adjustment of the bearing members cooperating with each one of the several collars. This manner of distributing the load not only necessitates a more or less complex structure, but also entails a large consumption of time and laborious effort in securing even an approximate equalization of the bearing pressures—and this, at best, is only temporary as it is quickly disturbed by temperature changes and numerous other factors of variation. It is an object of this invention to provide a multiple-unit bearing with simple and effective means for establishing any desired and predetermined distribution of the bearing pressure on the respective bearing members and for automatically maintaining that desired distribution under all conditions of operation, irrespective of the causes which tend to vary the load on different portions of the engaging surfaces.

It has heretofore been proposed to equalize the pressure on the members of a plurality of bearing units by the use of levers or other elements for interconnecting the several units. All suggestions of this kind, of which I am aware, have been more or less defective, and have involved the transmission of the entire load or pressure on each set or group of bearing members for effecting the desired equalization of pressure on the different groups. Such suggestions are entirely impracticable for use with bearings of the larger sizes, and even more or less impractical for use with bearings of the smaller sizes, because of the nature of the pressure distribution systems that are required when the pressure-transmitting elements must be of sufficient strength to withstand the stresses incident to the transmission of the entire load on each of the multiple-unit groups. It is an object of this invention to provide a multiple-unit bearing, composed of a plurality of units or groups of bearing members, with means for equitably distributing the load on and between the respective groups or units, which involves the transmission of only a part of the load or pressure on each of the groups or units; whereby substantial equalization between the several groups or units may be effected in a simple and practical manner in bearings of all sizes, and without unduly complicating or increasing the bulk or weight of the structure.

A further object of the invention is to provide a bearing system, composed of a plurality of units, with means for equitably distributing the bearing pressure on and between the respective units which utilizes the pressure, or a part of the pressure, on only one of the bearing segments comprised in each of said units.

Another object of the invention is to provide a bearing comprising a plurality of bearing surfaces, a plurality of bearing segments cooperating with each of said bearing surfaces, and means for equitably distributing the load on and between the respective bearing surfaces by equalizing or balancing the pressure on single segments associated with each of said bearing surfaces.

Yet another object of the invention is to provide a bearing comprising a plurality of bearing surfaces, a group of bearing segments cooperating with each of said bearing surfaces, a set of members for equalizing or equitably distributing the individual bearing pressure on the bearing segments of each of said groups, and other means for equalizing or equitably distributing the aggregate load on the several groups by utilizing the pressure, or a part of the pressure, on a single equalizing or pressure-distributing member associated with each of said groups.

Another object of the invention is to provide a bearing comprising a plurality of units with means for substantially equalizing the pressure on and between the respective units which is simple in construction, inexpensive to manufacture, easy to install and efficient in operation. Other objects will appear as the description of the invention proceeds.

Stated broadly, the invention comprises a plurality of rotatable bearing members, stationary bearing members cooperating therewith, and instrumentalities for equitably distributing the pressure on and between the respective bearing surfaces of said members which utilize less than the whole load or bearing pressure on each of said bearing surfaces. Each of the stationary bearing members preferably comprises a group or plurality of bearing segments cooperating with one of the rotatable bearing surfaces; and the means for equitably distributing the pressure on the several bearing groups preferably utilizes the pressure, or a part only of the pressure, on a bearing segment of each of said groups. In the preferred embodiments of the invention, means are provided for substantially equalizing the pressure on the individual elements of each of said groups of segments, and the instrumentalities for equitably distributing the pressure between the respective groups of bearing members coact and cooperate with the equalizing means for the individual segments, and utilize the pressure, or a part only of the pressure, on a single element of each of the said equalizing means.

The invention is capable of receiving a variety of mechanical expressions, several of which are shown on the accompanying drawings, but it is to be expressly understood that the drawings are for purposes of illustration only and are not to be construed as a definition of the limits of the invention, reference being had to the appended claims for that purpose.

In said drawings:—

Fig. 3 is a half axial section of another embodiment of the present invention.

Fig. 4 is a fragmentary axial section of yet another embodiment of the present invention.

Fig. 8 is an axial section of another embodiment of the present invention.

Fig. 9 is a schematic elevation developed into a single plane to illustrate more clearly the pressure-distributing and transmitting members of the embodiment of Fig. 8.

Fig. 10 is an axial section of another embodiment of the present invention.

Fig. 11 is a schematic elevation developed into a single plane to illustrate more clearly the pressure-distributing and transmitting members of the embodiment of Fig. 10.

Fig. 16 is a schematic elevation developed into a single plane to illustrate more clearly the pressure-distributing and transmitting members of the embodiment of Figs. 14 and 15.

Fig. 17 is a half axial section illustrating another embodiment of the present invention.

Fig. 18 is a schematic plan view illustrating another embodiment of the present invention.

Figure 1:
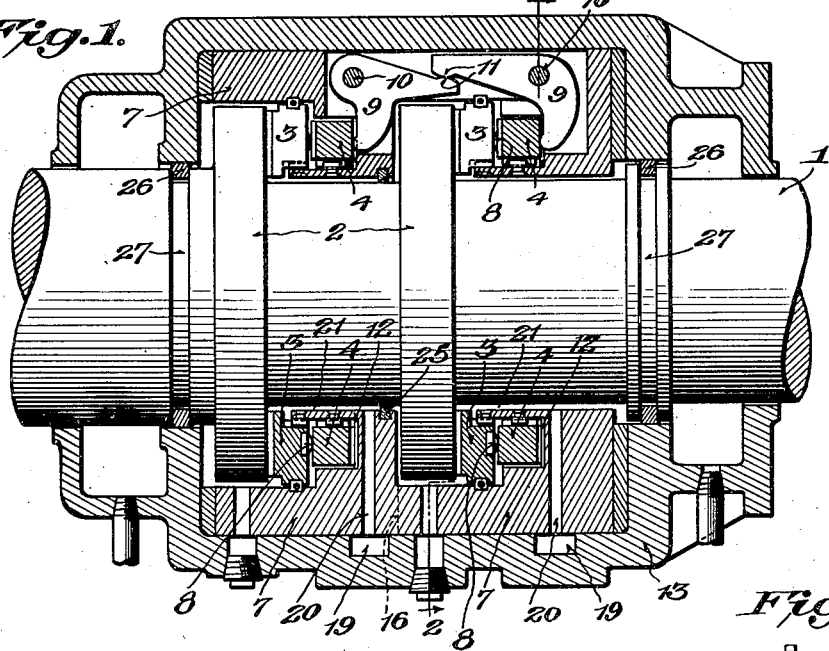
Fig. 1 is an axial section of a bearing embodying the present invention, taken on the line 1—1 of Fig. 2.
Figures 2, 19:
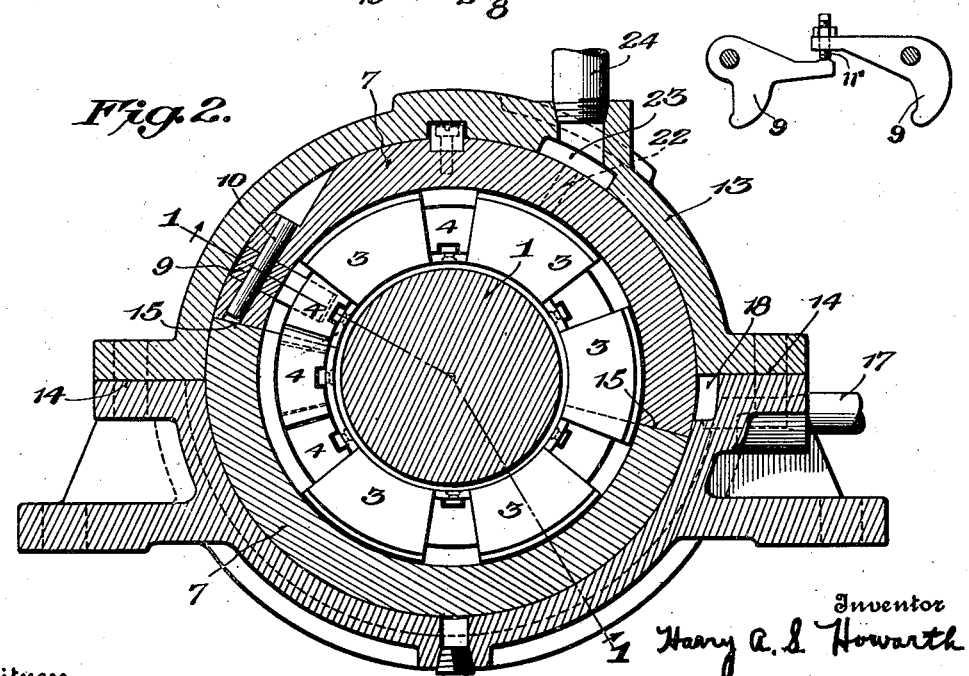
Fig. 2 is a radial section taken on the line 2—2 of Fig. 1.
Fig. 19 is a fragmentary view of a variation of the construction shown in Fig. 1.

In the form shown in Figs. 1 and 2, 1 designates a shaft provided with a plurality of thrust collars 2. Cooperating with each of said thrust collars 2 is a stationary bearing member of any suitable construction. Each of said stationary bearing members preferably comprises a plurality or group of bearing segments 3, which may take the form of a plurality or series of separate bearing shoes, as shown; or the form of a plurality or series of flexibly connected bearing segments; or the form of a continuous or semi-continuous flexible ring, which may be so constructed as to provide a plurality of segmental bearing portions. Each of said groups of bearing segments 3 may constitute a complete annular series extending around the shaft, as here shown; or said segments may extend only part way around the shaft as in some of the embodiments of the invention to be described hereinafter.

Means are preferably provided for substantially equalizing the pressure on the several bearing segments 3 that are associated with each of the said collars 2. Any suitable means for effecting this result may be employed, that illustrated in Figs. 1 and 2 comprising a series of tiltably-mounted, overlapping blocks, which constitute a substantially continuous flexible equalizing structure of the type disclosed and claimed in the application of Albert Kingsbury, e. g. application Serial No. 80,569, filed Feb. 26, 1916. Such an equalizing structure is shown more in detail in Fig. 7 and consists, in the form shown, of a series of blocks 4, each of which has one face provided with a relatively blunt radial knife-edge 5, and has its radial edges rabbeted as shown at 6; the alternate blocks of this series are positioned with their knife-edges 5 in rocking engagement with the base member 7, and the intermediate blocks of the same series are arranged to bridge the ends of said first blocks (with their rabbeted shoulders 6 in engagement) and form supports for the bearing segments 3. These bearing segments are preferably mounted on the equalizing structure in such manner as to tilt—both circumferentially of the shaft, to form wedge-shaped oil films, and radially of the shaft, to equalize the pressure on the inner and outer zones of said segments—in accordance with the principle of the Kingsbury bearings. To this end, each of said segments 3 is shown as provided with a spherically-faced button 8 in its rear face, which is mounted on the knife-edge 5 of an intermediate or bridge block 4 of the equalizing structure. It is to be expressly understood, however, that any other suitable means may be provided for effecting the desired mounting of the bearing segments. It is also to be understood that the invention is not limited to the use of the particular equalizing structure here shown; as any other suitable means may be provided for equitably distributing the pressure on the several bearing segments that cooperate with each of the collar surfaces.

Each of the collars 2, with its associated group or series of bearing segments or shoes 3 and the means for substantially equalizing the pressure on the different segments of the said group or series constitutes a single bearing unit for receiving and supporting the end thrust on the shaft 1. It is desirable that the total thrust load on the entire bearing should be predeterminately distributed over and between the several units thereof, preferably to the end that each of the said units shall sustain its proper and proportional part of the said load. In accordance with the present invention, means are provided for automatically maintaining the desired distribution of pressure between the several bearing units, and, in order to avoid the size and strength of parts that would be necessary if the said automatic means had to sustain or transmit the entire pressure acting on or transmitted by each of said collars, this means is so constructed as to utilize only a part of the total load or pressure acting on or transmitted by each of said collars in order to equitably distribute the thrust pressure.

In the form shown in Figs. 1 and 2, one block 4, of each of the equalizing systems associated with a group of bearing segments 3, is mounted on a pressure-transmitting member in the form of a bell-crank lever 9 suitably pivoted at 10 in the base or cage member 7; and the levers of two successive groups are arranged in pressure-transmitting relation, as by the engagement of overlapping arms of the said levers. When the levers are in direct engagement, as here shown, the contacting faces are preferably made spherical or cylindrical as shown at 11. But in place of direct contact between the arms of the levers, one of the said elements may be provided with an adjusting screw 11' having a spherically or cylindrically curved end for engagement with the other lever, as shown in Fig. 19. The use of a screw 11' permits of a preliminary adjustment of the relation of the said levers 9, so that less care need be exercised in making said levers to exact size.

In operation, each group or series of equalizing members 4 cooperates with the associated group of bearing segments 3 to substantially equalize the pressure on the several segments of each of said groups, and each of said equalizing members 4 in turn sustains its proportional part of the bearing pressure on the associated collar 2. Therefore, the equalizing member which is mounted on each lever 9 transmits to the said lever a pressure equal to the load sustained thereby which pressure, owing to the manner of operation of such an equalizing system, is substantially equal to the pressure sustained by each of the equalizing members of the corresponding series, which in turn is substantially equal to the pressure sustained by each of the segments of the corresponding group. The corresponding arms of the levers 9 being of equal length, the said levers will substantially equalize or balance the pressure on the equalizing members supported thereby; and owing to the manner of operation of equalizing systems of this character, the load on all of the equalizing members in each of the unit systems will thus be substantially equalized. As a result of this action, the individual bearing pressures on the segments of each of the bearing units will be substantially inter-equalized; and the aggregate bearing pressures on all the segments of the respective units will also be substantially equalized. It is not essential, however, that the pressure on the several bearing collars be exactly equalized; as by suitably proportioning the arms of the levers 9, the aggregate load can be otherwise distributed between the respective collars 2.

As each segment is mounted on a single block 4, and this is in turn mounted on the adjacent ends of contiguous blocks 4 which are supported on the base 7, it follows that each segment transmits the pressure sustained thereby to its supporting block, and each supporting block transmits one half its load to each of the blocks on which it is mounted, whereby each block in contact with the base 7 reacts thereon with a pressure equal to that on each of the said bearing segments. This is equally true of each block 4 which transmits pressure to a lever 9. Therefore the total load on the respective collars 2 is substantially equalized, or otherwise suitably distributed, by utilizing the pressure on a single equalizing member, and consequently on a single bearing segment, of each of the groups associated with the respective collars; the automatic distribution of pressure being effected by transmitting, from one group to the next, only that part of the load that is carried by one equalizing block, and therefore one bearing segment, of each of the said units or groups.

While the structure of Figs. 1 and 2 is shown as provided with only two bearing collars, the same system of predeterminately distributing the pressure between the respective collars may be extended to any desired number of collars; a similar pair of levers 9 being interposed between members of the second and third units, another between members of the third and fourth units, and so on.

In the form shown, each of the series of equalizing members or blocks 4 is mounted upon a filler ring 12 interposed between the said blocks and the base member 7; these filler rings being made of such thickness as to effect approximate equalization of the load on the respective bearing units. By the use of such filler rings less movement will be required of the members of the various equalizing systems in order to obtain complete equalization. These filler rings, however, are not essential to the utilization of my invention, as the desired distribution of load pressures will be effected even though they are omitted. If the adjusting screw or screws 11' are employed, they alone may be relied on to secure the approximate adjustment of pressure on the members of the different groups or units.

The bearing heretofore described may be mounted in a housing 13 of any suitable construction. In the form shown, said housing is made in halves with a joint 14 so that the upper half of the housing may be removed for inspection and repair of the bearing parts. The base or cage member 7 is also preferably made in halves as shown by the joint at 15. Such an arrangement is not essential, however, as the cage and housing may be of any suitable construction and, if the thrust collars are made to slip over the end of the shaft, the housing 13 and the base or cage member 7 may be constructed as complete annuli, provided the base member 7 be composed of axially separable sections, as by the provision of a joint at the position indicated by the dotted line 16.

Any suitable means may be provided for supplying the bearing surfaces with oil. In the form shown, oil is led through pipe 17 to a groove or passage 18 which extends, axially of the bearing, a part of the length of the housing. Communicating with said passage 18 are a plurality of circumferential grooves or passages 19, one for each of the units, said passages 18 being formed in the lower half of the housing and communicating through passages 20 with the spaces 21 between the shaft and the base member 7. From the latter spaces the oil flows radially outward between the bearing surfaces of the collars 2 and the bearing segments 3, whence it leaves the bearing through passages 22 which communicate with an axially-extending groove or passage 23 in communication with the outlet pipe 24. By this arrangement, the bearing surfaces are continuously supplied with a copious flow of the lubricant. To prevent oil flowing from one bearing unit to the other, a wiper ring 25 may be mounted in the base member 7 in engagement with the surface of the shaft. To prevent oil escaping from the bearing, an oil seal of any suitable construction may be provided at each end of the housing 13. In the form shown, a sealing ring 26, which cooperates with a groove 27 provided in or on the shaft, is located in each of the apertures through which the shaft 1 enters the chamber in which the bearing members are disposed.

While the structure of Figs. 1 and 2 has been shown as applied to a horizontal shaft, it is to be understood that the pressure-distributing and transmitting system here employed is of equal utility when used in conjunction with a vertical or inclined shaft, the system of lubricating the bearing being suitably varied to conform with the arrangement of the shaft.

In the embodiment of the invention shown in Fig. 3, a different arrangement of levers is illustrated for substantially equalizing or equitably distributing the bearing pressure on the several bearing units. In this form, 28 is a vertical shaft, having mounted thereon, in any suitable way, a plurality of thrust collars 29. Cooperating with the bearing face of each of said thrust collars are a plurality or group of bearing segments 30. The segments 30 of the upper group are each mounted on a lever 31 of the first class, while the segments 30 of the lower group are each mounted on a lever 32 of the second class. In order that said segments 30 may be free to tilt both circumferentially and radially, their surfaces of engagement with the levers 31 and 32 are spherical in form, as shown at 33; and, in order that said levers 31 and 32 may have the requisite freedom of movement, they are fulcrumed on ball supports 34. Each lever 31 of the upper group is connected to the corresponding lever 32 of the lower group by a tension rod 35 which is preferably provided with spherical surfaces of engagement with the said levers. In order that the relation of the levers 31 and 32 may be adjusted, the length of the connectors 35 can be varied by means of nuts 36 threaded on the rods 35 and in engagement with the levers 31. In order that the pressure on the several segments of each group may be substantially equalized, the fulcrum members 34 for the levers 32 are mounted upon a series of interrelated and conjoined equalizing blocks 4 of the type heretofore described. Obviously such a series of equalizing blocks 4 could be equally well employed with the fulcrum members 34 of the upper group if desired.

By suitably proportioning the length of the arms of the levers 31 and 32, the pressure on the two elements of each pair of lever-connected bearing segments 30 may be either substantially equalized or otherwise suitably proportioned; and by the use of the series of equalizing members 4, the loads on the successive connected pairs of segments are also substantially equalized. This arrangement requires a connection between each of the supporting members of the upper group of bearing segments and the corresponding or adjacent supporting member of the lower group; but, by mounting the fulcrum members 34 of both groups of levers on a series of equalizing members 4—so as to inter-equalize the bearing pressure on the several segments of each group—only one connecting member 35 need be used to equalize or otherwise equitably distribute the load on and between the upper and the lower units. And while the structure here shown employs but two thrust collars, it is to be understood that this inter-equalizing system is of equal utility when employed in conjunction with a larger number of thrust collars; the bearing segments of each group being in such case similarly connected with the bearing segments of the next adjacent group.

Any suitable means may be provided for lubricating the bearing of Fig. 3. In the form shown, the bearing is surrounded by a housing 37 on which is mounted an oil retaining wall 38. Said housing 37 and wall 38 are designed to contain baths of oil in which the bearing members run submerged. To prevent leakage of oil from the upper unit to the lower unit, a suitable wiper ring 39 may be interposed between the lower collar 29 and the housing 37 and suitable packing 40 may be positioned in the aperture or apertures through which the connecting member or members 35 pass. To maintain the desired oil level in the housing 37 an overflow pipe 41 is shown in communication with the interior of the housing 37 and a similar pipe may be employed if desired in communication with the oil well provided by the wall 38.

The arrangement shown in Fig. 3 is applied to a vertical shaft and is suitable for taking the thrust load in one direction only. In the form shown in Fig. 4, a similar inter-equalizing system is applied to a bearing for a horizontal or inclined shaft, and is suitably modified so as to take the thrust load in either direction. In this embodiment of the invention, the horizontal shaft 1 is provided with a plurality of collars 2, and a plurality of groups of bearing segments 43 and 44 cooperate with the respective collars for taking the thrust in one direction, while another plurality of groups of bearing segments 45 and 46 cooperate with the same collars for taking the thrust in the opposite direction. Each segment of each of the groups 43 and 46 is mounted on a lever, 47 and 48 respectively, of the second class; and each segment of each of the groups 44 and 45 is mounted on a common interposed lever 49 of the first class; the said levers being connected by tension rods 50. The surfaces of engagement of the bearing segments with their respective levers is made of spherical form, and the respective levers are preferably fulcrumed on ball supports 51. Adjustment of the relation of the levers 47, 48 and 49 is provided by the nuts 52. Each of the groups of levers 47 and 48 is mounted on a system of equalizing blocks or members 4 of the type heretofore described.

When the thrust pressure is toward the right, as viewed in Fig. 4, the thrust is taken by the bearing segments 45 and 46, the pressure on each pair of segments 45 and 46 is substantially balanced by the action of the levers 48 and 49 and the connecting member 50, and the pressure on the successive connected pairs of segments is substantially balanced or equalized by the action of the equalizing system on which the levers 48 are mounted. When the thrust pressure is toward the left, as viewed on Fig. 4, the thrust is taken by the bearing segments 43 and 44, the pressure on each pair of segments 43 and 44 is then substantially balanced by the action of the levers 47 and 49 and the connecting member 50, and the pressure on the successive connected pairs of segments is also substantially balanced or equalized by the action of the equalizing system on which the levers 47 are mounted.

The arrangement illustrated in both Figs. 3 and 4 can be utilized regardless of whether or not the bearing segments 3, and the associated series of equalizing members 4, constitute complete annular systems extending around the shaft.

Figure 5:
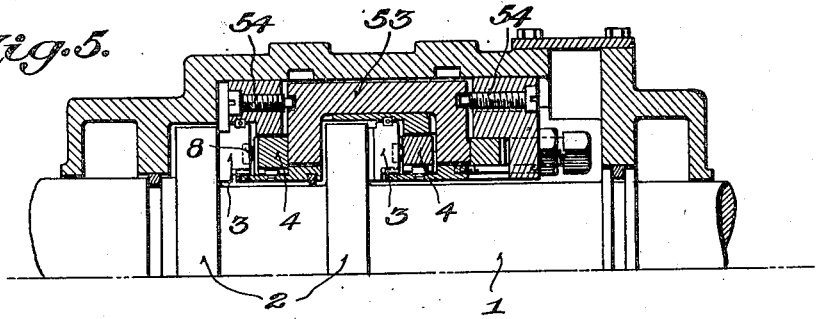
Fig. 5 is a half axial section of another embodiment of the present invention taken through the axis of one of the pressure-transmitting members.
Figure 6:
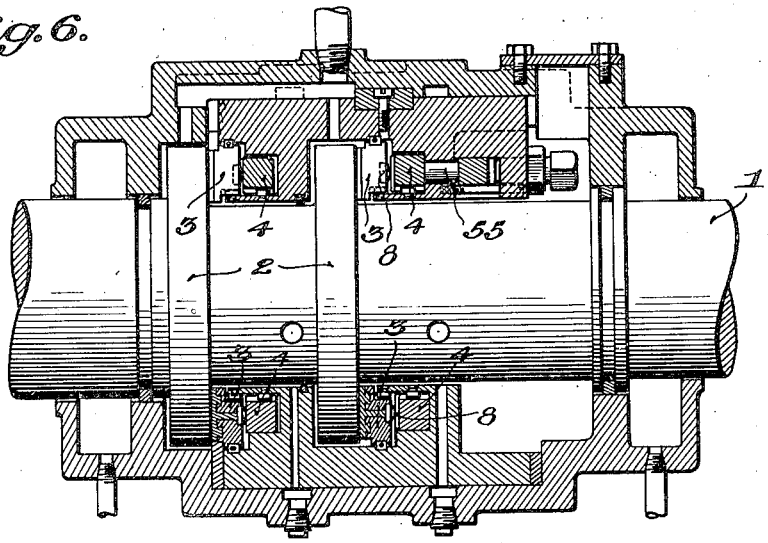
Fig. 6 is another axial section of the same bearing showing in elevation another of the pressure-transmitting members.
Figure 7:
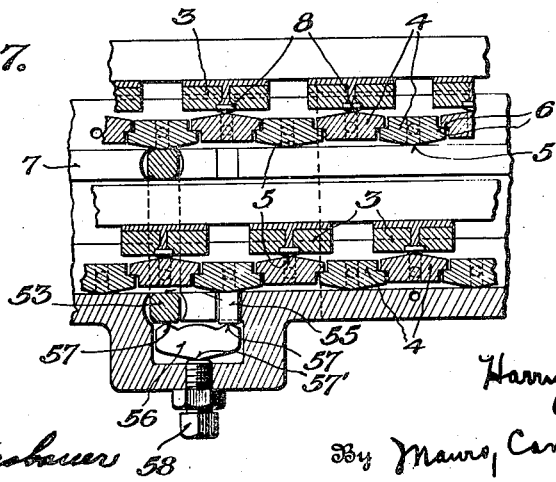
Fig. 7 is a schematic elevation developed into a single plane to illustrate more clearly the arrangement of the pressure-distributing and transmitting members of the embodiment of Figs. 5 and 6.

In the embodiments of the invention thus far described, the pressure-transmitting members for equalizing or otherwise suitably distributing the pressure between the successive bearing units have been made in the form of levers. A different form of pressure-transmitting member is shown in the embodiment of Figs. 5, 6, and 7.

In the structure here illustrated, the shaft 1 is provided with a plurality of thrust collars 2 each of which coacts with a plurality or group of bearing segments 3; and the pressure on the individual segments of each of said groups is substantially balanced or equalized by a series of equalizing blocks or members 4 of the form heretofore described.

In this arrangement, however, one of the equalizing blocks 4, of one of the equalizing series, is mounted on a direct-pressure-transmitting member 53 which is made of U-shaped form to pass around the adjacent collar, and is maintained against lateral displacement by screws 54 that engage loosely in apertures provided in the ends of the said member 53; and one of the equalizing blocks 4 of the other equalizing series is mounted on a straight, direct-pressure-transmitting member 55. The pressures on these members 53 and 55 are substantially balanced by a lever 56 which is mounted in a recess in the housing and is provided with knife-edge surfaces 57 for engagement with the ends of the said members 53 and 55. This lever 56 may be supported in any suitable way; in the form shown, it is provided with a third knife-edge surface 57' which may engage the wall of the housing or which may be mounted on an adjustable bolt 58 whereby the position and relation of the bearing segments may be preliminarily adjusted for approximate equalization.

In operation, the load on the pressure-transmitting members 53 and 55 is substantially balanced by the lever 56, whereby the pressure on a block 4 in one of the equalizing series is substantially equalized with the pressure on a corresponding block 4 of the other equalizing series. Owing to the manner of operation of equalizing systems of this character, the load on the respective blocks of each series is substantially equalized, as is also the load on the respective segments of each group. Therefore the pressure on the various segments and the various blocks of each group being substantially equalized by the interaction of the series of blocks 4 associated with each group and the pressure on two corresponding blocks of the two series being also substantially balanced by the action of the pressure-transmitting members 53, 55, 56, the total load pressure on the bearing will be equitably distributed over all of the segments of all of the different groups.

While the arms of the lever 56 have been shown as of equal length—to substantially equalize the pressure on the connected groups of bearing segments—it is apparent that the lever may be designed to otherwise predeterminedly distribute the load between the respective groups. Also while the pressure-distributing system of Figs. 5, 6 and 7 is shown as applied to a horizontal shaft, it is of equal utility when applied to bearings for vertical or inclined shafts. Any suitable system of lubrication, such as described in conjunction with the embodiment shown in Figs. 1 and 2, may be employed with the structure of Figs. 5, 6 and 7 when used in conjunction with a horizontal or inclined shaft.

The arrangement shown in Figs 5, 6 and 7 may be employed with more than two thrust collars by providing a system of pressure-transmitting members 53, 55, 56 between each succeeding pair of collars and their associated bearing elements; or the arrangement illustrated in Figs. 8 and 9 may be employed. In the form here shown, the shaft 1 is provided with six thrust collars 2 each of which cooperates with a plurality or group of bearing segments 3—the segments of each group being mounted on an interconnected series of equalizing members or blocks 4, in the manner heretofore described. One of the equalizing blocks 4 of all except one of the said series is mounted on a U-shaped pressure-transmitting member 59, similar to the member 53 of Fig. 5. One of the equalizing blocks of the remaining series is mounted on a straight pressure-transmitting member 60, similar to the member 55. Each of the members 59 and 60 is operatively supported by or mounted on one of the blocks of a separate series of equalizing members 61 similar in construction to the series of equalizing blocks 4. In fact the same size and form of equalizing members may be used in all the series so that the blocks 4 and 61 may be interchangeable.

In operation, the pressure on each of said pressure-transmitting members 59 and 60 is substantially balanced by the interaction of the series of equalizing blocks 61, whereby the pressures on the associated blocks of each of the series of blocks 4 are substantially equalized; and by reason of the normal operation of the different series of equalizing blocks 4, the aggregate load is uniformly or equitably distributed over or among the bearing segments of all of the said groups.

The structures shown in Figs. 5 to 9 are suitable for use with bearings on which the thrust load is in one direction only. In the embodiment of the invention shown in Figs. 10 and 11, a structure is provided which is suitable for taking thrust in either direction. In this arrangement the shaft 1 is provided with a plurality of thrust collars 2. Co-operating with one face of each of said thrust collars is a group or series of bearing segments 62 which are shown as extending around the lower half only of said collar, said segments 62 being mounted as heretofore described on a series of equalizing members or blocks 4. Cooperating with the opposite face of each of said thrust collars is a second group or series of bearing segments 63 which are shown as extending around the upper half only of said collar and are mounted on another series of equalizing members or blocks 4. These two groups of segments 62 and 63, are therefore adapted to respectively take the thrust in opposite directions.

To equalize or otherwise equitably distribute the load over and between the several groups of bearing segments for taking the thrust in either direction, any suitable arrangement of pressure-distributing and transmitting means may be employed; but the form here shown comprises the general organization of parts illustrated in Figs. 8 and 9. This specific embodiment, moreover, exemplifies a construction by which less than the whole bearing pressure on one of the bearing segments or equalizing members may be utilized for securing an equitable distribution, or a substantial equalization, of the load pressure on and between two or more successive bearing units.

As heretofore pointed out in connection with the arrangements previously described, each equalizing block in contact with the base member 7 reacts against said base member with a pressure equal to that on each of the bearing segments with which the series of equalizing blocks cooperates. In each of the embodiments of the invention heretofore described, one of the equalizing blocks of each of the series is mounted on or cooperates with a pressure-transmitting member so as to transmit the entire pressure borne by said equalizing block to the said pressure-transmitting member. Therefore, each of the said pressure-transmitting members is subjected to a stress that is equal to the total fraction of the load carried by each segment of each group; and, in the embodiment of Figs. 8 and 9, each such member transmits such stress to each of the equalizing blocks 61 coacting therewith. When the group of segments and the coacting series of equalizing blocks are not complete annular systems—so that they extend only part way around the shaft as in the present embodiment—the end blocks of each series of equalizing blocks or members are mounted at one extremity on fixed members 64, as disclosed and claimed in the application of Albert Kingsbury, Sr., No. 222,336, filed March 14, 1918. As each of the end members 64 supports only one end of an equalizing block, it bears only one-half of the entire pressure carried by each of the said blocks and therefore only one-half of the pressure on each of the bearing segments. By replacing one of these fixed end members by a pressure-transmitting member, it is possible to utilize only one-half of the bearing pressure on each equalizing block and therefore on each segment for the purpose of equitably distributing the total load over and between the several groups of bearing members.

In the form shown in Figs. 10 and 11, one of the equalizing blocks of two of the series of equalizing blocks is mounted on a pressure-transmitting member 65; and an end member 64 of each of the other two series of equalizing blocks is replaced by a pressure-transmitting member 66 or 67. Three of said pressure-transmitting members,—i. e. those designated 65 and 66—are made U-shaped to pass around the intermediate collars, while the remaining pressure-transmitting member—i. e. that designated 67— is straight. All of the said pressure-transmitting members are mounted on a series of equalizing blocks 68, similar to, or exactly like, the equalizing blocks 4, the pressure-transmitting members 65 being centrally supported on two of the equalizing blocks 68, while the pressure-transmitting members 66 and 67 are supported by the ends of end equalizing blocks 68'. Each of the pressure-transmitting members 65 transmits to its associated block 68 a pressure equal to the load on one of each of the series of equalizing blocks 4, and therefore on one of each group of bearing segments 62 of the corresponding unit; and each of the pressure-transmitting members 66 and 67 transmits to an end equalizing block 68' a pressure equal to one-half of the load on one of the equalizing blocks 4 and therefore on the associated segments supported thereby. As the pressure-transmitting members 65 are centrally mounted on intermediate equalizing blocks 68 while the pressure-transmitting members 66 and 67 are mounted on the extremities of the end equalizing blocks 68', their equalizing effect is the same; and the load on the equalizing members, and therefore on the bearing segments, of the different groups is thus substantially balanced to effect equitable distribution of the pressure over the bearing surfaces of the entire system.

It is to be understood that the groups of bearing segments 63 with their cooperating series of equalizing blocks 4 are also provided with pressure-transmitting members as heretofore described, one of said members being shown at 69, and the separate series of equalizing blocks with which said pressure-transmitting members cooperate is indicated at 70.

Figure 12:
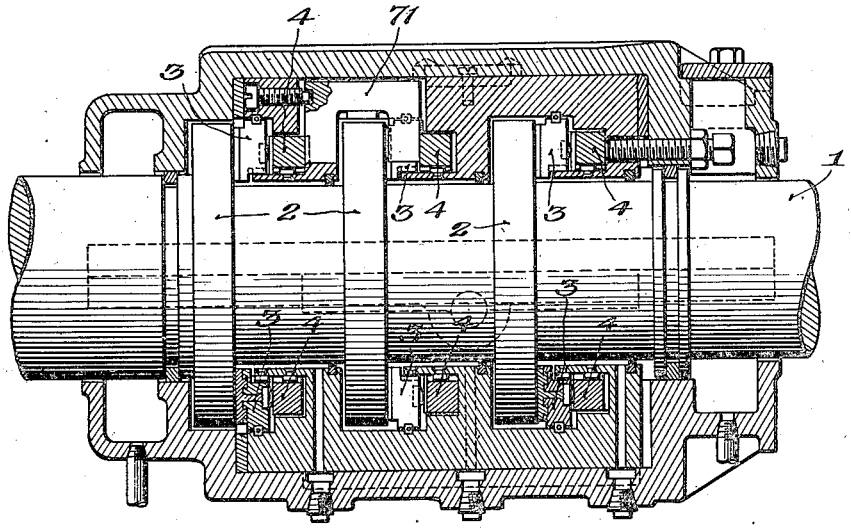
Fig. 12 is an axial section of another embodiment of the present invention.
Figure 13:
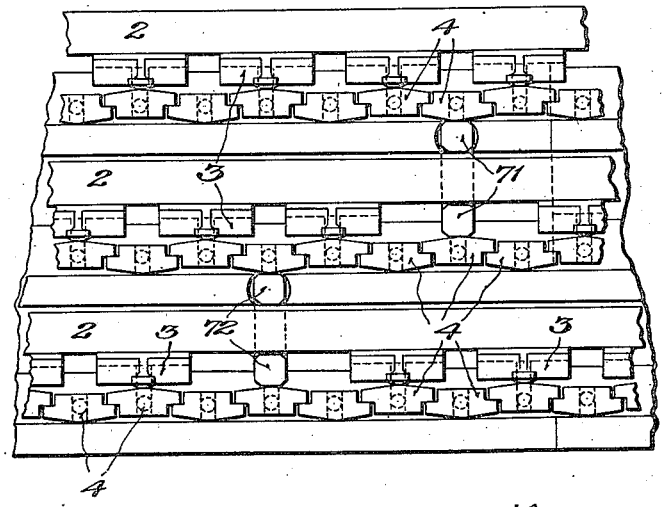
Fig. 13 is a schematic elevation developed into a single plane to illustrate more clearly the pressure-distributing and transmitting members of the embodiment of Fig. 12.

In place of using a separate series of equalizing blocks for equitably distributing the loads on the pressure-transmitting members—as shown in the embodiments of Figs. 8 to 11—the load on the bearing segments of more than two groups may be substantially equalized by the use of short U-shaped pressure-transmitting members as illustrated in Figs. 12 and 13.

Figure 14:
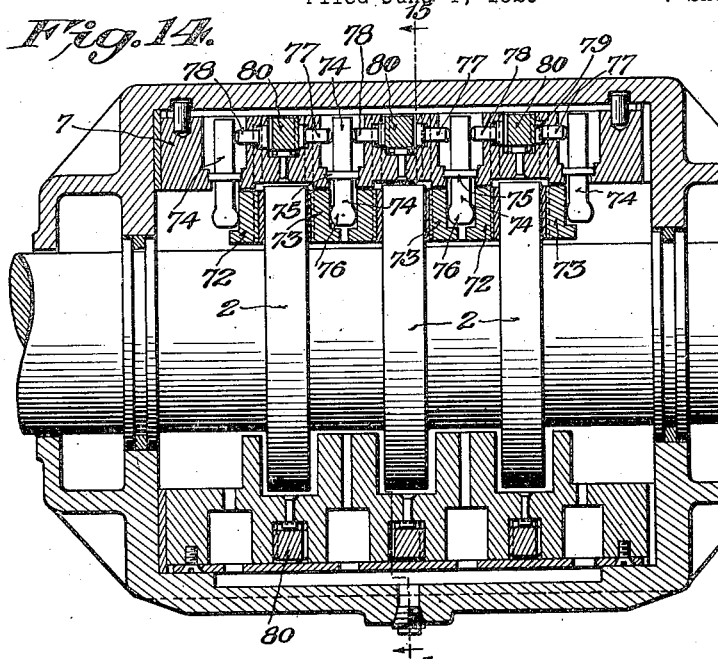
Fig. 14 is an axial section of another embodiment of the present invention taken on the line 14—14 of Fig. 15.
Figure 15:
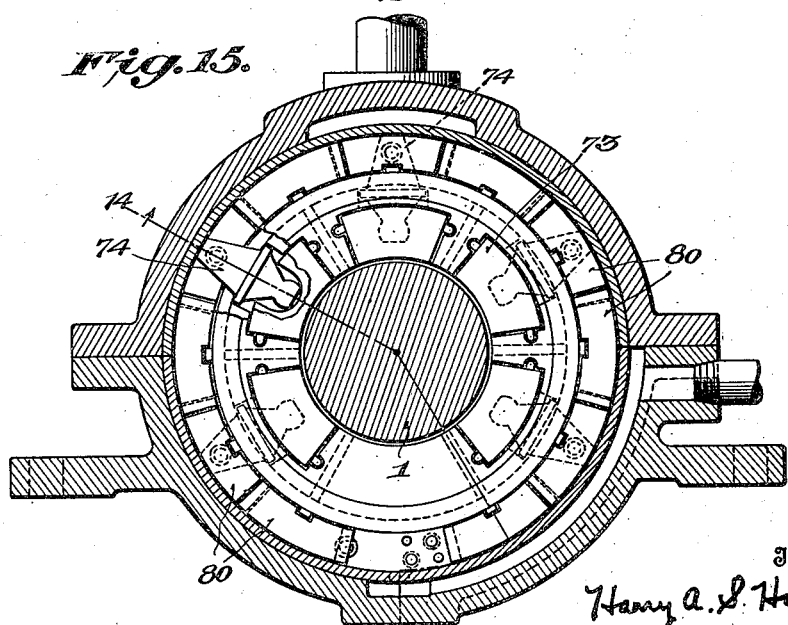
Fig. 15 is a radial section on the line 15—15 of Fig. 14.

In the construction here shown, the shaft 1 is provided with a plurality of thrust collars 2 each of which cooperates with a plurality of bearing segments 3 mounted on a corresponding series of equalizing blocks 4. One of the equalizing blocks of the upper series shown in Fig. 13 is mounted on a U-shaped pressure-transmitting member 71, which in turn is mounted on one of the equalizing blocks 4 of the next adjacent series. Another of the equalizing blocks of the latter series is again mounted on a U-shaped pressure-transmitting member 72, which, in turn, is mounted on one of the equalizing blocks 4 of the next adjacent series. In this arrangement the pressure on one equalizing member of each series is transmitted to an adjacent member of the next adjacent series; and, as the equalizing members of each series effect a substantial equalization of the individual loads on the bearing segments cooperating therewith, the aggregate pressure on all of the bearing segments of all of the groups is uniformly distributed throughout the system. This arrangement, however, necessitates the omission of one of the bearing segments from each of the groups except the first; so that, while the bearing pressure is substantially equalized on all of the individual segments, the load sustained by the several units is not equal. Thus, in the arrangement of Figs. 12 and 13, if there are six segments in the group shown at the top of Fig. 13, there will be but five segments in each of the other two groups. As the pressure on all of said segments is substantially equalized, the upper group will sustain six-sixteenths of the load while each of the other groups will sustain five-sixteenths of the load. This arrangement has the advantage of eliminating all long pressure-transmitting members, and also avoids the use of a separate series of equalizing blocks therefor; but it possesses the disadvantage that the pressure is not equally distributed between the respective units, and that all of the bearing surface of some of the thrust collars is not utilized. The unequal distribution of pressure among the respective units could be avoided, however, by omitting one of the bearing segments from the upper group and employing a fixed bridge block in the equalizing system thereof.

Where the thrust collars are relatively close together and it is desired to use opposed bearing segments for taking the thrust in either direction, the arrangement illustrated in Figs. 14, 15 and 16 may be employed. In the form here shown, the shaft 1 is provided with a plurality of thrust collars 2 having one set of surfaces which cooperate with a plurality of groups of bearing segments 72, for taking the thrust in one direction and having opposing surfaces, which cooperate with another plurality of groups of bearing segments 73, for taking the thrust in the opposite direction. Each opposed pair of bearing segments 72 and 73 is mounted on a lever 74 which is fulcrumed on the edge of a rib 75 in the base or cage member 7, and which is preferably provided with spherical surfaces of engagement with said segments as shown at 76. The end series of segments 72 and 73 are also mounted on similar levers 74.

Any suitable means may be employed for substantially equalizing the bearing pressure on the segments of each group and between the segments of the respective groups. In the form shown, each of the intermediate levers 74 is engaged at its outer end by a pair of opposed pins 77 and 78 provided with heads 79; and each of the end levers 74 is correspondingly engaged by a single pin 77 or 78. Mounted in the cage or base member 7, between each two groups or systems of levers 74, is a series of equalizing blocks 80 similar to the equalizing members 4 heretofore described. Each alternate equalizing block of each of these series is in engagement with the head 79 of one of the pins 77, while each intermediate equalizing block of said series is in engagement with the head 79 of one of the pins 78 (see Fig. 16). Each of the pins 77 and 78 extends through an opening in the base or cage member 7 and its head operates in a recess which affords a shoulder that limits the extent to which the pin may be moved longitudinally in one direction in its aperture.

Referring to Fig. 16, if the thrust on the levers 74 tends to move their outer ends upwardly, the pins 77 will be lifted, thus raising their heads out of engagement with the shoulders of their recesses and transmitting the pressure to the alternate blocks 81 of each series of equalizing members. This pressure is transmitted in turn to the intermediate blocks 82 of the series and moves the pins 78 until their heads engage the shoulders of their recesses and become relatively fixed with respect to the base or cage member 7. Each series of equalizing blocks, 81—82, will then act like the series of equalizing blocks 4 heretofore described; and will equitably distribute the load on the corresponding groups of bearing segments, by substantially balancing the pressure on the levers 74 through the coaction of the pins 77 with the intermediate blocks 81 of each series. If the thrust on the levers 74 tends to move their outer ends downwardly, the pins 78 will be brought into position to transmit the pressure to the intermediate blocks 82 of each series of equalizing members, and the latter will act in turn on the alternate equalizing blocks 81 and will press the heads of the pins 77 into fixed engagement with their shoulder supports in the base or cage member 7. Each series of equalizing blocks will then operate in the manner heretofore described—the pressure on the levers 74 being now substantially balanced by the coaction of the pins 78 with the blocks 82 of each series—and the load will be automatically and equitably distributed over the bearing segments which engage with each thrust collar;—this action being substantially the same when the thrust pressure is applied in either direction.

In order to automatically divide the load equitably between the different groups of bearing segments, I may employ any suitable means for transmitting pressure between elements of the several units. In the construction shown in Figs. 14, 15 and 16 the respective groups of bearing segments and equalizing members do not extend completely around the shaft, and the desired distribution of the load on the several sets of cooperating collar and segment bearing surfaces is effected by interposing a pressure-transmitting member 83 between the end blocks of the successive series of equalizing members. As each pressure-transmitting member 83 engages with one end of an equalizing block in each series, it transmits only one-half of the pressure on the said block and therefore on each bearing segment of the successive groups. In this specific embodiment of my invention, only three groups of bearing segments have been shown; but it is apparent that this general scheme of pressure distribution may be extended to any desired number of groups. It is to be understood, however, that this particular arrangement of equalizing pressure-transmitting members is not essential; as other arrangements—such for example one of those previously described—may be employed for securing an automatic and equitable distribution of the bearing pressure over and between the bearing surfaces that receive and support the load on the respective thrust collars.

The embodiment of Figs. 14, 15 and 16 possesses the advantage that the several planes of bearing engagement may be brought closely together; and the further advantage that only one series of equalizing members is required for each unit both to substantially equalize the bearing pressure among the individual segments of each group, and also to substantially balance the aggregate load on each group with the corresponding portions of the load on the adjacent groups.

Any suitable arrangement may be provided for properly lubricating the bearings shown in Figs. 10 to 16—the particular arrangement indicated being similar to the one which is more fully illustrated and described in connection with the embodiment of Figs. 1 and 2. Furthermore, these bearings, while shown as applied to horizontal shafts, are equally applicable to vertical or inclined shafts.

In all of the exemplications of the invention previously described, the axial thrust, or a part of the axial thrust, on one bearing segment, or on one equalizing member, of each of the several groups or units has been employed for effecting an automatic and equitable distribution of the total load over and between the bearing surfaces of the entire system. In place of employing the axial thrust on the bearing segments and equalizing members, for effecting an equitable distribution of the bearing pressure, a radial component of the thrust on the said segments or the equalizing members therefor may be utilized for effecting the desired distribution, as schematically illustrated for example in Figs. 17 and 18.

In the form shown in Fig. 17, the vertical shaft 84 is provided with a plurality of thrust collars 85, each of which cooperates with a plurality or group of bearing segments 86 that are so mounted as to create a radial component of the axial pressure thereon. In this construction, the rear face of each of the said segments 86 is axially inclined so as to exert a radial thrust on its support 88, which may be made in the form of a spherical member suitably mounted on the cage or base 89. The radial component of the pressure on one of the supporting members 88 of each group is received by a pressure-transmitting member 90, and the pressure on the member 90 of the upper group is substantially balanced with respect to the pressure on the member 90 of the lower group by an interposed pressure-transmitting lever 91 suitably pivoted on the cage or base member 89. To equalize the pressure on the different bearing segments of each group, one or both of said groups of segments may be mounted on, or provided with, radial equalizing means of any suitable construction. In the form shown, each of said groups of segments is provided with a series of equalizing blocks 100 which are structurally similar to the equalizing blocks 4, but which are so disposed, at an angle to the axis of the shaft, as to effect interequalization of the load pressure on the segments of each group by utilizing a component of the axial thrust thereon. Springs 101 are preferably provided for maintaining the supports 88 in proper engagement with the pressure-transmitting members 90; the said springs being sufficiently light so that they do not sensibly interfere with the balancing function of the associated members 90 and 91. By employing a set of pressure-transmitting members between each segment of the upper group and the contiguous segment of the lower group, only one series of radial equalizing means need be used for equitably distributing the load over all the bearing surfaces of the entire system.

In the form shown in Fig. 18, the bearing segments 92 of each group are mounted in any suitable way so as to establish an outwardly directed radial component of the thrust pressure on each segment, and these radial components of pressure are substantially equalized by a circumferential series of interconnected bridge blocks 93, 94, which are similar in form and action to the equalizing blocks 4. Each of the blocks 93 of this series engages the circumferential edge of a bearing segment and bridges the ends of the adjacent equalizing blocks 94 which are pivotally and tiltably mounted on the circumferential surface of the base or cage member. In order to transmit the radial pressure on one group of bearing segments to another group,—and thereby equitably distribute the load over and between the different groups of the system—two superimposed or adjacent blocks 94 of successive groups are radially supported on the opposite ends of a pressure-transmitting lever 95, which is similar, in form and action, to the lever 91 of Fig. 17. With such an arrangement, the total end thrust pressure on the bearing may be automatically and equitably divided between any desired number of cooperating collar and bearing segment units.

While the levers 91 and 95 have been described as acting to substantially equalize the aggregate pressure on the successive groups of segments, it is to be understood that, by suitably proportioning the arms of said levers, any other desired distribution of pressure between the said groups can be obtained.

The general characteristic feature of all of the hereinbefore described embodiments of my invention is the provision of a bearing construction which comprises a plurality of bearing units, and means for substantially equalizing, balancing or otherwise dividing the total load or thrust on and between the several bearing units which utilizes less than the aggregate bearing pressure on any one of said units. This invention also provides for the substantial equalization of the bearing pressure on each individual bearing segment of each of the several units; and therefore secures a predetermined and automatically maintained distribution of load over all the surfaces of bearing engagement between the relatively movable members of the complete system. By reason of this invention, all necessity for manually adjusting the supports for the bearing elements of the different groups or units is avoided, and the desired distribution of pressure on and between the said elements is continuously maintained irrespective of temperature changes or distortions or variations arising from whatever cause, while this result is accomplished by the use of simple pressure-transmitting members, which do not add materially to the complexity, weight or bulk of the construction, and which may be relatively light, since they do not sustain the entire load on each unit as in arrangements heretofore suggested.

While the present invention has been illustrated as applied to thrust bearings only, it is to be expressly understood that the general features of improvement are not limited to use in structures of this type, but are capable of utilization in journal and other bearings composed of a plurality of units. It is also to be understood that the pressure-distribution and transmission systems which I have illustrated are not limited to use in the particular organizations herein shown and described but may be employed in connection with various other bearing constructions for horizontal, inclined and vertical shafts in which the rotating member is required to carry a load or to take a thrust that may be applied always in one direction or alternately in different directions. Furthermore, it is to be understood that the means shown for equitably distributing the pressure between the respective units may be employed either when the bearing segments and the equalizing means therefor constitute complete annular series around the shaft, or when they extend only part way around the shaft. It is also to be expressly understood that the invention is not limited to the use of bearing segments or equalizing means of the specific types illustrated in the various figures of the drawings, as any suitable form and arrangement of multiple bearing surfaces and pressure-distributing mechanism—which is capable of performing the desired functions and attaining the desired results—may be employed. The term "bearing segments" is to be regarded as embracing constructions wherein a bearing unit comprises either a plurality or series of structurally separate elements, or a plurality or series of bearing segments or portions that are flexibly connected in any manner, as by integral webs or other interposed means, or otherwise united to form a bearing member whether continuous or semi-continuous. And, as the pressure-distribution and transmission systems disclosed are equally applicable whether the shaft be vertical, horizontal or inclined, it is likewise to be expressly understood that the claims are not to be limited to any particular positioning of the shaft. A number of preferred constructions and arrangements have been illustrated, for the purpose of exemplifying the scope of the invention; but the latter is capable of receiving a variety of other mechanical expressions many of which will now readily suggest themselves to those skilled in the art; and certain features thereof may be used independently of other features thereof; and other changes may be made in the construction and arrangement of parts without departing from the spirit and scope of this invention. Reference is therefore to be had to the claims hereto appended for a definition of the limits of the invention.

What I claim is:

1. In combination with a plurality of bearing members, a plurality of bearing segments cooperating with each of said bearing members, means for equitably distributing the pressure among the segments cooperating with each of said bearing members, and means utilizing less than the whole pressure on each of said bearing members for equitably distributing the pressure among the respective bearing members.

2. In combination with a plurality of bearing members, a group of bearing segments cooperating with each of said bearing members, means for equitably distributing the pressure among the segments of each group, and means utilizing only the pressure on a segment of each group for equitably distributing the pressure among the respective groups of segments.

3. In combination with a plurality of bearing members, a plurality of bearing segments cooperating with each of said bearing members, a set of pressure-distributing members for equitably distributing the pressure among the segments cooperating with each of said bearing members, and means utilizing only the pressure on a pressure-distributing member of each set for equitably distributing the pressure among the respective bearing members.

4. In combination with a plurality of bearing members, a plurality of bearing segments cooperating with each of said bearing members, means for equitably distributing the pressure among the segments cooperating with each of said bearing members, and means utilizing less than the whole pressure on each of said segments for equitably distributing the pressure among the respective bearing members.

5. In combination with a plurality of bearing members, a plurality of bearing segments cooperating with each of said bearing members, a set of pressure distributing members for equitably distributing the pressure among the segments cooperating with each of said bearing members, and means utilizing less than the whole pressure on each of said pressure-distributing members for equitably distributing the pressure among the respective bearing members.

6. In a thrust bearing, a plurality of thrust collars, bearing members cooperating therewith, and means utilizing less than the pressure on each of said collars for substantially equalizing the pressure on the respective collars.

7. In a thrust bearing, a plurality of thrust collars, bearing members cooperating with each of said collars, and means utilizing only the pressure on a bearing member cooperating with each of said collars for substantially equalizing the pressure on the respective collars.

8. In a thrust bearing, a plurality of thrust collars, bearing members cooperating with each of said collars, members for substantially equalizing the pressure on the bearing members associated with each of said collars, and means utilizing only the pressure on an equalizing member associated with each of said collars for substantially equalizing the pressure on the respective collars.

9. In a thrust bearing, a plurality of thrust collars, bearing members cooperating with each of said collars, and means utilizing less than the pressure on each of said bearing members for substantially equalizing the pressure on the respective collars.

10. In a thrust bearing, a plurality of thrust collars, bearing members cooperating with each of said collars, members for substantially equalizing the pressure on the bearing members associated with each of said collars, and means utilizing less than the pressure on each of said equalizing members for substantially equalizing the pressure on the respective collars.

11. In a bearing, a plurality of bearing members assembled in groups, means for equitably distributing pressure among the members of each group, and means utilizing only the pressure on a member of each group for equitably distributing the pressure among the respective groups of bearing members.

12. In a bearing, a plurality of bearing members assembled in groups, a plurality of members for substantially equalizing the pressure on the bearing members of each group, and means utilizing only the pressure on an equalizing member of each group for substantially equalizing the pressure on the respective groups of bearing members.

13. In a bearing, a plurality of bearing members assembled in groups, means for equitably distributing pressure among the members of each group, and means utilizing a part of the pressure on a member of each group for equitably distributing the pressure among the respective groups of bearing members.

14. In a bearing, a plurality of bearing members assembled in groups, a plurality of members for substantially equalizing the pressure on the bearing members of each group, and means utilizing a part of the pressure on an equalizing member of each group for substantially equalizing the pressure on the respective groups of bearing members.

15. In a bearing, a plurality of bearing members, a group of bearing segments cooperating with each of said bearing members, means for substantially equalizing the pressure on the bearing segments of each group, and means associated with a single bearing segment of each of the respective groups for substantially equalizing the pressure thereon.

16. In a bearing, a plurality of bearing members, a group of bearing segments cooperating with each of said bearing members, and means for substantially equalizing the pressure on the bearing segments of the respective groups by substantially equalizing the bearing pressure on a single member of each of said groups.

17. In a bearing, a plurality of bearing members, a group of bearing segments cooperating with each of said bearing members, a plurality of members for substantially equalizing the bearing pressure on the segments of each group, and means for substantially equalizing the pressure on the bearing segments of the respective groups by substantially equalizing the pressure on a single equalizing member of each of said groups.

18. In a bearing, a plurality of thrust collars, a plurality of tiltable bearing shoes cooperating with each of said collars, and means for substantially equalizing the pressure on the respective collars by substantially equalizing the pressure on a single shoe associated with each of said collars.

19. In a bearing, a plurality of thrust collars, a plurality of tiltable bearing shoes cooperating with each of said collars, a plurality of equalizing blocks for substantially equalizing the pressure on the shoes associated with each of said collars, and means for substantially equalizing the pressure on the respective collars by substantially equalizing the pressure on a single block associated with each of said collars.

20. In a bearing, a plurality of bearing members, a group of bearing segments cooperating with each of said members, members for substantially equalizing the pressure on the bearing segments of each group, and means cooperating with a single equalizing member of each of the respective groups for substantially equalizing the pressure on the respective groups.

21. In a bearing, a plurality of axially-spaced rotatable bearing members, a plurality of stationary bearing members cooperating with said rotatable bearing members, and means utilizing less than the bearing pressure of each of said rotatable members for equitably distributing the pressure among the respective bearing members.

22. In a bearing, a plurality of bearing segments assembled in groups, and means utilizing the pressure on less than the whole number of segments of each group for equitably distributing the pressure among the respective groups of segments.

23. In combination with a plurality of bearing members, a plurality of bearing segments cooperating with each of said bearing members, and means utilizing less than the bearing pressure on the segments associated with each of said bearing members for equitably distributing the pressure among the respective bearing members.

24. In combination with a plurality of bearing members, a plurality of bearing segments cooperating with each of said bearing members, and means utilizing the bearing pressure on a single segment associated with each of said bearing members for equitably distributing the pressure among the respective bearing members.

25. In combination with a plurality of bearing members, a plurality of bearing segments cooperating with each of said bearing members, and means utilizing less than the bearing pressure on each of said segments for equitably distributing the pressure among the respective bearing members.

26. In a bearing, a plurality of bearing members assembled in groups, and means utilizing only the pressure on a member of each of said groups for equitably distributing the pressure among the respective groups of bearing members.

27. In a bearing, a plurality of bearing members assembled in groups, and means utilizing a part of the pressure on a member of each of said groups for equitably distributing the pressure among the respective groups of bearing members.

28. In a bearing, a plurality of bearing segments assembled in groups, means for equitably distributing the pressure among the segments of each group, and means utilizing the pressure on less than the whole number of segments of each group for equitably distributing the pressure among the respective groups of segments.

29. In a bearing, a plurality of bearing collars, a plurality of bearing members cooperating with each of said collars, a system for substantially equalizing the pressure on the bearing members cooperating with each collar, a separate equalizing system, and means cooperating with said equalizing systems whereby the pressure on the respective collars is substantially equalized.

30. In a bearing, a plurality of bearing collars, a plurality of bearing members cooperating with each of said collars, means for substantially equalizing the pressure on the bearing members cooperating with each of said collars, a separate equalizing means, and means transmitting pressure from each of said first-named equalizing means to said last-named equalizing means.

31. In a bearing, a plurality of bearing collars, a plurality of bearing members cooperating with each of said collars, means for substantially equalizing the pressure on the bearing members cooperating with each of said collars, a separate equalizing means, and means transmitting pressure from a single equalizing member associated with each of said collars to said last-named equalizing means.

32. In a bearing, a plurality of bearing collars, a plurality of bearing members cooperating with each of said collars, a series of members for substantially equalizing the pressure on the bearing members cooperating with each of said collars, a separate series of equalizing members, and means for transmitting pressure from each of said first-mentioned series of equalizing members to a member of said separate series of equalizing members.

33. In a bearing, a plurality of bearing collars, a plurality of bearing members cooperating with each of said collars, a series of members for substantially equalizing the pressure on the bearing members cooperating with each of said collars, a separate series of equalizing members, and means for transmitting pressure from one of each of said first-mentioned series of equalizing members to a member of said separate series of equalizing members.

34. In a bearing, a plurality of bearing collars, a plurality of bearing members cooperating with each of said collars, a series of members for substantially equalizing the pressure on the bearing members cooperating with each of said collars, a separate series of equalizing members, and means for transmitting a part of the pressure on one of each of said first-mentioned series of equalizing members to a member of said separate series of equalizing members.

35. In a bearing, a plurality of bearing members, a plurality of bearing segments cooperating with each of said bearing members, and means individual to a bearing segment cooperating with each of said bearing members or substantially equalizing the bearing pressure on the respective bearing members.

36. In a bearing, a plurality of bearing members, a plurality of bearing segments cooperating with each of said bearing members, members for substantially equalizing the pressure on the bearing segments cooperating with each of said bearing members, and means individual to an equalizing member associated with each of said bearing members for substantially equalizing the bearing pressure on the respective bearing members.

37. In a bearing, a plurality of bearing members, a group of bearing segments cooperating with each of said bearing members, and cooperating levers for substantially equalizing the pressure on a segment of each of said groups.

38. In a bearing, a plurality of bearing members, a group of bearing segments cooperating with each of said bearing members, members for substantially equalizing the pressure on the bearing segments of each of said groups, and cooperating levers for substantially equalizing the pressure on the respective groups of equalizing members.

39. In a bearing, a plurality of bearing members, a group of bearing segments cooperating with each of said bearing members, members for substantially equalizing the pressure on the bearing segments of each of said groups, and cooperating levers for substantially equalizing the pressure on an equalizing member of each of said groups.

40. In a bearing, a plurality of bearing members, a group of bearing segments cooperating with each of said bearing members, cooperating levers for substantially equalizing the pressure on a segment of each of said groups, and means for substantially equalizing the pressure on the segments of one or more of said groups.

41. In a bearing, a plurality of bearing members, a group of bearing segments cooperating with each of said bearing members, pressure-transmitting members associated with a single segment of each of said groups, and means for substantially equalizing the pressure on said pressure-transmitting members.

42. In a bearing, a plurality of bearing members, a group of bearing segments cooperating with each of said bearing members, members for substantially equalizing the pressure on the bearing segments of each of said groups, pressure-transmitting members coacting with each of said groups of equalizing members, and means for substantially equalizing the pressure on said pressure-transmitting members.

43. In a bearing, a plurality of bearing members, a group of bearing segments cooperating with each of said bearing members, members for substantially equalizing the pressure on the bearing segments of each of said groups, a pressure-transmitting member coacting with an equalizing member of each of said groups, and means for substantially equalizing the pressure on said pressure-transmitting members.

44. In a bearing, a plurality of bearing members, a group of bearing segments cooperating with each of said bearing members, members for substantially equalizing the pressure on the bearing segments of each of said groups, pressure-transmitting members associated with an equalizing member of each of said groups, and a series of equalizing members for substantially equalizing the pressure on said pressure-transmitting members.

45. In a bearing, a plurality of bearing members, a group of bearing segments cooperating with each of said bearing members, members for substantially equalizing the pressure on the bearing segments of each of said groups, pressure-transmitting members coacting with said groups of equalizing members, and a series of equalizing members for substantially equalizing the pressure on said pressure-transmitting members.

46. In a bearing, a plurality of bearing members, a group of bearing segments cooperating with each of said bearing members, pressure-transmitting members coacting with a segment of each of said groups, and a series of equalizing members for substantially equalizing the pressure on said pressure-transmitting members.

47. In a bearing, a plurality of bearing members, a group of bearing segments cooperating with each of said bearing members, members for substantially equalizing the pressure on the bearing segments of each of said groups, pressure-transmitting members associated with an equalizing member of each of said groups, one or more of said pressure-transmitting members transmitting a part only of the pressure on its associated equalizing member, and means coacting with said pressure-transmitting members for substantially equalizing the pressure on said bearing members.

48. In a bearing, a plurality of bearing members, a group of bearing segments cooperating with each of said bearing members, members for substantially equalizing the pressure on the segments of each of said groups, pressure-transmitting members associated with an equalizing member of each of said groups, one or more of said pressure-transmitting members constituting a support for one end only of the corresponding equalizing member, and means coacting with said pressure-transmitting members for substantially equalizing the pressure on said bearing members.

49. In a bearing, a plurality of bearing members, a group of bearing segments cooperating with each of said bearing members, members for substantially equalizing the pressure on the segments of each of said groups, and means for substantially equalizing the pressure on the respective groups comprising members cooperating with said equalizing members and one or more of which constitutes a support for one end only of the corresponding equalizing member.

50. In a bearing, a plurality of bearing members, a group of bearing segments cooperating with each of said bearing members, pressure-transmitting members associated with a segment of each of said groups, one or more of said last-named members transmitting a part only of the pressure on the corresponding segment, and means coacting with said pressure-transmitting members for substantially equalizing the pressure on said bearing members.

51. In a bearing, a plurality of bearing members, a group of bearing segments cooperating with each of said bearing members, pressure-transmitting members for transmitting only a part of the pressure on a segment of each of said groups, and means for substantially equalizing the pressure on said pressure-transmitting members.

52. In a bearing, a plurality of bearing members, a group of bearing segments cooperating with each of said bearing members, members for substantially equalizing the pressure on the segments of each of said groups, and pressure-transmitting members for transmitting only a part of the pressure on an equalizing member of each of said groups to equalizing members of other of said groups to substantially equalize the pressure on said bearing members.

53. In a bearing, a plurality of bearing members, a group of bearing segments cooperating with each of said bearing members, levers coacting with said bearing segments, means coacting with said levers for substantially equalizing the pressure on the segments of each of said groups, and means for substantially equalizing the pressure on the respective groups of equalizing members.

54. In a bearing, a plurality of bearing members, a group of bearing segments cooperating with each of said bearing members, and means utilizing a radial component of the pressure on said segments for substantially equalizing the pressure on said bearing members.

55. In a bearing, a plurality of bearing members, a group of bearing segments cooperating with each of said bearing members, means for substantially equalizing the pressure on the segments of each of said groups, and means utilizing a radial component of the pressure on said equalizing means for substantially equalizing the pressure on said bearing members.

56. In a bearing, a plurality of bearing members, a group of bearing segments cooperating with each of said bearing members, and means utilizing a radial component of the pressure on a segment of each of said groups for substantially equalizing the pressure on said bearing members.

57. In a bearing, a plurality of bearing members, a group of bearing segments cooperating with each of said bearing members, members for substantially equalizing the pressure on the segments of each of said groups, and means utilizing a radial component of the pressure on an equalizing member of each of said groups for substantially equalizing the pressure on said bearing members.

58. In a bearing, a plurality of bearing members, a group of bearing segments cooperating with each of said bearing members, and cooperating levers for substantially equalizing the pressure on said groups of bearing segments.

59. In a bearing, a plurality of bearing members, a group of bearing segments cooperating with each of said bearing members, pressure-transmitting members coacting with the respective groups of bearing segments, and a series of rocking equalizing members for substantially equalizing the pressure on said pressure-transmitting members.

60. In a bearing, a plurality of bearing members, a group of bearing segments cooperating with each of said bearing members, members for substantially equalizing the pressure on the segments of each of said groups, and means for substantially equalizing the pressure on the respective groups comprising pressure-transmitting members for transmitting only a part of the pressure on an equalizing member of each of said groups.

61. In a bearing, a plurality of bearing members, a group of bearing segments cooperating with each of said bearing members, members for substantially equalizing the pressure on the bearing segments of each of said groups, and means for transmitting less than the total pressure on each of said bearing members between equalizing members of the respective groups to substantially equalize the pressure on said bearing members.

62. In a bearing, a plurality of bearing members, two groups of bearing segments cooperating with each of said bearing members for taking the pressure in opposite directions, and means cooperating with a bearing segment of each of said groups for substantially equalizing the pressure in either direction on the respective bearing members.

63. In a bearing, a plurality of bearing members, two groups of bearing segments cooperating with each of said bearing members for taking the pressure in opposite directions, means cooperating with a segment of each of said groups for taking the pressure in one direction to substantially equalize the pressure on said bearing members in said direction, and other means cooperating with a segment of each of said groups for taking the pressure in the other direction to substantially equalize the pressure on said bearing members in said other direction.

64. In a bearing, a plurality of bearing members, a group of bearing segments cooperating with each of said bearing members, and means cooperating with a single segment of each of said groups for substantially equalizing the pressure on said bearing members.

65. In a bearing, a plurality of bearing members assembled in groups, an equalizing system associated with each of said groups for equitably distributing the pressure among the members of the group, and means utilizing less than the total pressure on each of said equalizing systems for equitably distributing the pressure among the respective groups of bearing members.

66. In combination with a plurality of bearing members, a plurality of bearing segments cooperating with each of said bearing members, members for substantially equalizing the pressure on the bearing segments cooperating with each of said first-named bearing members, and means utilizing only the pressure on an equalizing member associated with each of said first-named bearing members for equitably distributing the pressure among the respective bearing members.

67. In combination with a plurality of bearing members, a plurality of bearing segments cooperating with each of said bearing members, members for substantially equalizing the pressure on the bearing segments cooperating with each of said first-named bearing members, and means utilizing less than the pressure on an equalizing member associated with each of said first-named bearing members for equitably distributing the pressure among the respective bearing members.

68. In a bearing, a plurality of bearing members assembled in groups, members for substantially equalizing the pressure on the bearing members of the respective groups, and means utilizing the pressure on a single equalizing member of each of said groups for substantially equalizing the pressure on the respective groups of bearing members.

69. In a bearing, a plurality of bearing members assembled in groups, members for substantially equalizing the pressure on the bearing members of the respective groups, and means utilizing less than the pressure on an equalizing member of each of said groups for substantially equalizing the pressure on the respective groups of bearing members.

70. In a bearing, a plurality of bearing members, a group of bearing segments cooperating with each of said bearing members, pressure transmitting members for transmitting the pressure on a single segment of each of said groups, and means for substantially equalizing the pressure on said pressure transmitting members.

71. In a bearing, a plurality of bearing members, a group of bearing segments cooperating with each of said bearing members, members for substantially equalizing the pressure on the segments of each of said groups, and pressure-transmitting members for transmitting the pressure on a single equalizing member of each of said groups to equalizing members of other of said groups to substantially equalize the pressure on said bearing members.

72. In a bearing, a plurality of bearing members, a group of bearing segments cooperating with each of said bearing members, members for substantially equalizing the pressure on the segments of each of said groups, and means for substantially equalizing the pressure on the respective groups comprising pressure transmitting members for transmitting only the pressure on an equalizing member of each of said groups.

73. In a bearing, a plurality of bearing members, a group of bearing segments cooperating with each of said bearing members, members for substantially equalizing the pressure on the segments of each group, and means cooperating with a single equalizing member of each of said groups for substantially equalizing the pressure on said bearing members.

74. In a bearing, a plurality of bearing members, a group of bearing segments cooperating with each of said bearing members, members for substantially equalizing the pressure on the segments of each group, and pressure-transmitting members associated with a single equalizing member of each of said groups and cooperating therewith to balance the pressure on the respective groups.

75. In a bearing, a plurality of bearing members, a group of bearing segments cooperating with each of said bearing members, and pressure transmitting members associated with a single segment of each of said groups and cooperating therewith to balance the pressure on the respective groups.

76. In a bearing, a plurality of bearing members, a group of bearing segments cooperating with each of said bearing members, pressure transmitting members associated with a single segment of each of said groups and cooperating therewith to balance the pressure on the respective groups, and means for equitably distributing the pressure among the segments of each group.

77. In a bearing, a plurality of bearing members, a group of bearing segments cooperating with each of said bearing members, members for equitably distributing the pressure among the segments of each of said groups, and pressure transmitting members associated with a single pressure distributing member of each of said groups and cooperating therewith to balance the pressure on the respective groups.

78. In a bearing, a plurality of bearing members, a group of bearing segments cooperating with each of said bearing members, members for equitably distributing the pressure among the segments of each of said groups, pressure transmitting members for transmitting the pressure on a single pressure distributing member of each of said groups, and means for equitably distributing the pressure among said pressure transmitting members.

79. In a bearing, a plurality of bearing members, a group of bearing segments cooperating with each of said bearing members, members for substantially equalizing the pressure on the segments of each of said groups, and means for substantially equalizing the pressure on the respective groups comprising members cooperating with said equalizing members and one or more of which transmits only a part of the pressure on the corresponding equalizing member.

80. In a bearing, a plurality of bearing members assembled in groups or units and means balancing a part of the pressure on each of said groups or units for equitably distributing the pressure among the respective groups or units.

In testimony whereof I have signed this specification.

HARRY A. S. HOWARTH.